Sept. 2, 1969  R. E. CLARK  3,465,121
PANELS
Filed Sept. 12, 1966  2 Sheets-Sheet 1
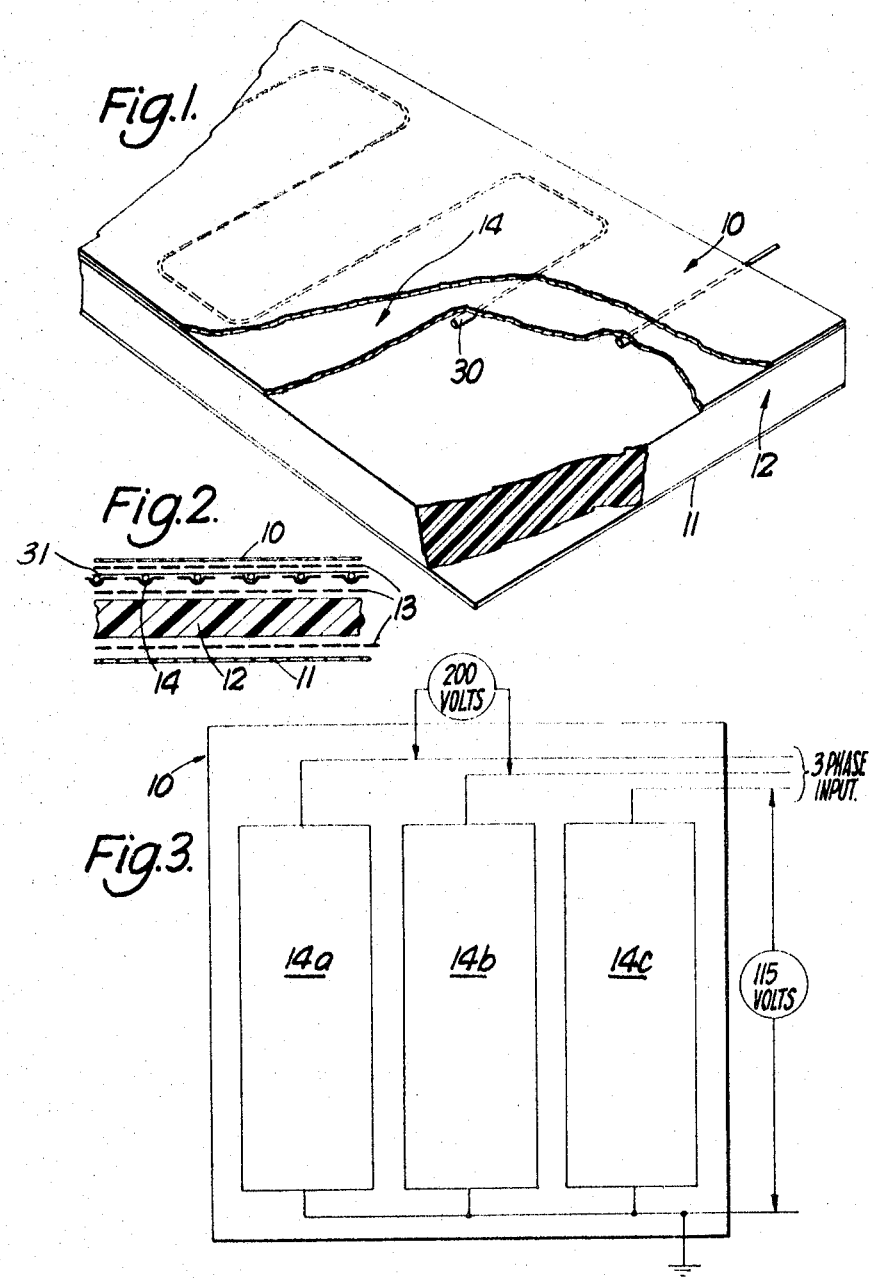
Inventor
Robert Edward Clark
by
Watson, Cole, Grindle + Watson
Attorneys United States Patent Office 3,465,121
Patented Sept. 2, 1969

3,465,121
PANELS
Robert Edward Clark, Surrey, England, assignor to BTR
Industries Limited, London, England
Filed Sept. 12, 1966, Ser. No. 578,534
Int. Cl. H05b 1/00, 3/00, 11/00
U.S. Cl. 219—213                              5 Claims

ABSTRACT OF THE DISCLOSURE

A floor panel including a plurality of heating elements which are electrically connected together in parallel, and control means to regulate the electrical supply to the elements in response to the total heat emitted from the panel, so as to keep the total heat emitted from the panel constant even in the event of failure of one or more of the individual elements.

The invention provides a laminated panel for use as a floor surface comprising an upper layer of rigid material (e.g. of metal or of glass epoxy resin laminate) an intermediate layer of electrically insulating material and a lower layer of foamed plastics material there being a plurality of heating elements embedded in side by side relation in the intermediate layer, said elements being connected together electrically in parallel, in which there is a thermostatic control for the panel, comprising means to sense the total heat emitted by the heating elements and there is means to control the electrical supply to the heating elements in response to the said total amount of heat.

Preferably the sensing means is a conducting element extending across the heating elements, and having a resistance which varies with temperature.

The conducting element may be arranged to lie in one arm of a Wheatstone bridge circuit, which circuit operates control means to regulate power input to the heating elements in response to the resistance of the elements.

Preferably each heating element is a sheet of insulating material having on its face adjacent the said inner layer a printed electrical heating circuit.

The insulating material is preferably a glass epoxy resin laminate.

Each heating element may be secured to the panel by an epoxy resin adhesive.

There may be a second layer of rigid material (e.g. of metal or glass epoxy resin laminate) on the face of the laminate remote from the upper layer of rigid material.

The invention also includes an aircraft having a panel as described above.

A specific embodiment of a laminated panel according to the invention will now be described with reference to the accompanying drawings of which:

FIGURE 1 is a cut-away perspective view of a heated floor panel,

FIGURE 2 is an exploded sectional view of the panel.

FIGURE 3 is a diagrammatic view of the disposition of three heating elements in the panel showing associated electrical connections.

Figure 4:
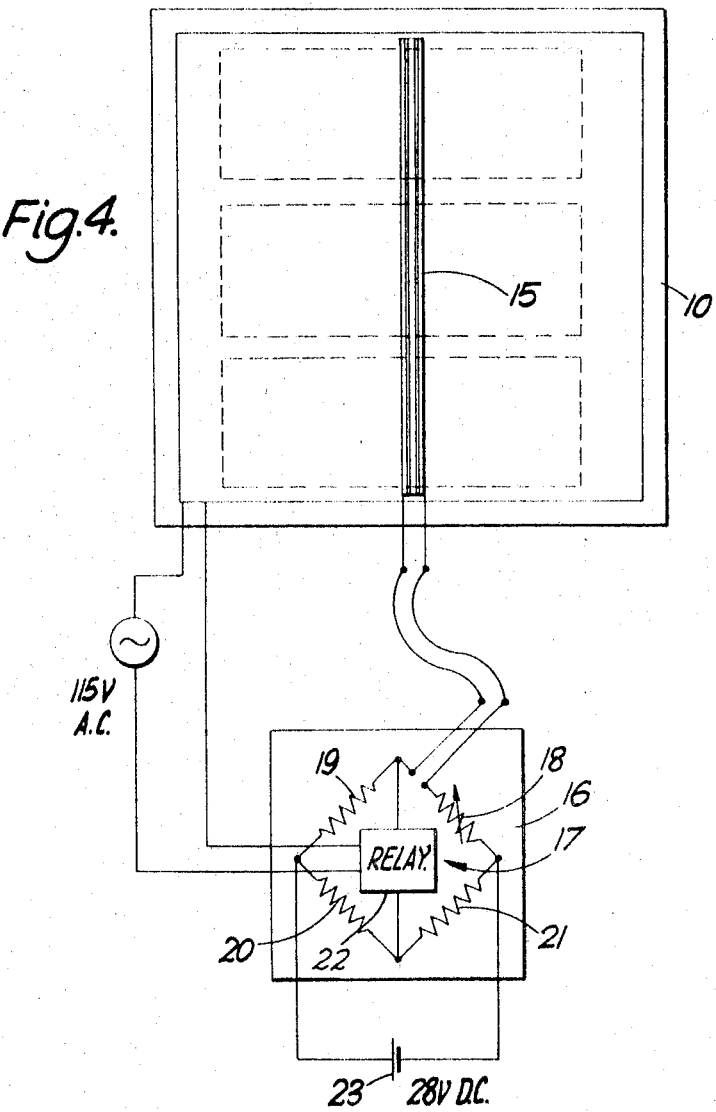
FIGURE 4 is a diagrammatic view of a control circuit to be used in conjunction with the heating elements shown in FIGURE 3.

As shown in FIGURES 1 and 2 the panel comprises upper and lower outer sheets of aluminium 10 and 11, respectively, separated by an inner layer 12 of the foamed polyvinyl chloride material sold under the trade name Plasticell.

A heating element 14 comprises a continuous wire element 30 bent to zigzag configuration and supported on a sheet for example of glass epoxy resin laminate 31. The heating element 14 is coated with epoxy resin and forms an intermediate layer between the sheet 10 and the layer 12.

The panel is laminated together using an epoxy resin adhesive 13.

A number of these heating elements 14a, 14b, 14c are placed between the upper aluminium sheet 10 (i.e. the sheet which in use is nearer the interior of the aircraft cabin) and the inner layer 12 of the panel as shown in FIGURE 3. The three elements are connected together in parallel so that if one element should fail the others continue to operate.

The panels are arranged to have a power output of the order of 20 to 30 watts per square foot and the panels are arranged to have a surface temperature of the order of 25 to 30 degrees centigrade.

Each heater element 14a, 14b, 14c has a 115 volt A.C. supply connected across it, and this supply is drawn from a 3-phase 200 volt A.C. input, one phase being fed to each element.

FIGURE 4 shows details of an electric circuit that may be used to control the temperature of a heated floor panel. The heating elements are arranged to lie across the panel as indicated by the dotted lines. The panel has embedded in it between the heating elements 14 and the upper sheet 10 a temperature sensing element 15 in the form of a pure nickel wire having a resistance of about 100 ohms.

There is a control box 16 containing a Wheatstone bridge circuit 17, and the temperature sensing element 15 is connected into one arm of the Wheatstone bridge circuit in series with a variable resistance component 18 having a range of between 0 and 40 ohms. Adjacent to this arm there is a second arm containing a fixed resistance 19 of approximately 120 ohms. The two other arms of this bridge circuit are formed by fixed resistances 20 and 21.

There is a relay 22 connected between the junctions of the fixed resistance 19 with the sensing element 15 and the junction of the two resistances 20 and 21, which relay is adapted to switch on or off the power supply to the heater elements 14. The Wheatstone bridge is supplied with current from a 28 volt D.C. control supply 23.

All the fixed resistances used in the bridge circuit are not sensitive to changes in temperature.

In use power is supplied to the heater elements 14 to heat the panel, and so to heat the surroundings of the panel. When the panel reaches the desired temperature the bridge circuit will switch the power supply off in response to the change in the out of balance current in the relay 22. When the temperature drops below the desired value the relay switches the power on again. The temperature of the panel may be controlled by means of the variable resistance 18.

It is a feature of the invention that the temperature sensing element 15 lies across the three heating elements 14a, b and c. This arrangement is adopted in order that if one of the heating elements should fail the relay will respond to the heat output from the remaining two elements, and so that the total heat emitted should continue to be controlled to substantially the same amount that was previously emitted by the three elements.

In alternative embodiments a heating element 14 comprises a printed circuit formed from a glass epoxy resin laminate which supports a resistive metal foil on one side. The metal foil is preferably of copper or of copper nickel alloy. The heater elements are arranged with their insulating backings against the aluminium sheet and their printed circuits against the inner layer which is itself an insulating material and are bonded into the panel by the epoxy resin adhesive system.

I claim:

1. A laminated floor panel for use as a floor surface having:
 (a) an upper layer of rigid material,
 (b) an intermediate layer of electrically insulating material,
 (c) a layer of a foamed plastics material before said intermediate layer,
 (d) a plurality of electrical heating elements embedded in side by side relation in the intermediate layer,
 (e) means to connect said elements together electrically in parallel,
 (f) means lying between said heating elements and said upper layer and integral with the panel to sense the temperature of the heating elements, and
 (g) means to control the electrical supply to the heating elements in response to the temperature sensed by said sensing means.

2. A laminated panel as claimed in claim 1 in which the sensing means is an electric conducting element extending across the heating elements and having a resistance which varies with temperature.

3. A laminated panel as claimed in claim 2 in which the conducting element is arranged to lie in one arm of a Wheatstone bridge circuit, which circuit operates control means to regulate power input to the heating elements in response to the resistance of the elements.

4. A laminated floor panel as claimed in claim 1 wherein:
 said upper layer comprises an aluminium sheet, said intermediate layer comprises a glass epoxy resin laminate,
 said foam plastics material is comprised of a layer of rigid foamed polyvinyl chloride,
 a lower layer of aluminium sheet,
 said sensing means comprising a temperature sensing element of nickel wire extending across the heating elements the resistance of which element varies in response to the heat emitted by the heating elements,
 a Wheatstone bridge circuit having supply means, fixed resistances in two adjacent arms, an adjustable resistance in another arm, and the temperature sensing element in the fourth arm,
 and said control means controlling the supply of current to the heating elements in response to the out of balance current of the bridge.

5. A laminated floor panel for use as a floor surface having:
 (a) an upper layer of rigid material,
 (b) an intermediate layer of electrically insulating material,
 (c) a layer of a foamed plastics material before said intermediate layer,
 (d) a plurality of heating elements embedded in side by side relation in the intermediate layer,
 (e) means to connect said elements together electrically in parallel,
 (f) means lying between said heating elements and said upper layer and integral with the panel to sense the temperature of the heating elements, and
 (g) means to control the electrical supply to the heating elements in response to the temperature sensed by said sensing means,
said sensing means being an electric conducting element extending across the heating elements and having a resistance which varies with temperature, and said conducting element being arranged to lie in one arm of a Wheatstone bridge circuit, which circuit operates control means to regulate power input to the heating elements in response to the resistance of the elements.

References Cited

UNITED STATES PATENTS

| | | | |
|---|---|---|---|
| 2,961,522 | 11/1960 | Hammer | 219—543 X |
| 3,031,739 | 5/1962 | Boggs | 219—345 X |
| 3,041,441 | 6/1962 | Elbert et al. | 219—345 |
| 3,379,859 | 4/1968 | Moirriott | 219—543 X |
| 2,680,186 | 6/1954 | Pridmore et al. | 236—78 X |
| 2,834,862 | 5/1958 | Meyers | 219—345 |
| 2,928,927 | 3/1960 | Taylor | 219—212 X |
| 3,218,436 | 11/1965 | Edwards et al. | 219—544 |

FOREIGN PATENTS 986,374    3/1965    Great Britain.

JOSEPH V. TRUHE, Primary Examiner

C. L. ALBRITTON, Assistant Examiner

U.S. Cl. X.R.

219—345, 519